US012676792B2

(12) United States Patent
Jain et al.

(10) Patent No.: US 12,676,792 B2
(45) Date of Patent: Jul. 7, 2026

(54) DYNAMIC MULTI-CLOUD NETWORK PROVISIONING

(71) Applicant: Cisco Technology, Inc., San Jose, CA (US)

(72) Inventors: Prakash C Jain, Fremont, CA (US); Sanjay Kumar Hooda, Pleasanton, CA (US); Vinay Saini, Bangalore (IN); Pascal Thubert, Roquefort les Pins (FR); Arman Rezaee, San Francisco, CA (US); Samer M. Salam, Beirut (LB)

(73) Assignee: Cisco Technology, Inc., San Jose, CA (US)

( * ) Notice: Subject to any disclaimer, the term of this patent is extended or adjusted under 35 U.S.C. 154(b) by 63 days.

(21) Appl. No.: 18/946,109

(22) Filed: Nov. 13, 2024

(65) Prior Publication Data

US 2026/0135755 A1 May 14, 2026

(51) Int. Cl.
*H04L 41/0803* (2022.01)
*H04L 43/50* (2022.01)

(52) U.S. Cl.
CPC .......... *H04L 41/0803* (2013.01); *H04L 43/50* (2013.01)

(58) Field of Classification Search
CPC ............................ H04L 41/50; H04L 41/0803
See application file for complete search history.

(56) References Cited

U.S. PATENT DOCUMENTS

| | | | | |
|---|---|---|---|---|
| 9,866,467 | B1 * | 1/2018 | Barnum | .................. H04L 69/24 |
| 11,716,284 | B2 * | 8/2023 | Jain | .......................... H04L 45/74 |
| 2020/0162337 | A1 * | 5/2020 | Jain | ......................... H04L 43/08 |
| 2021/0374032 | A1 | 12/2021 | Rakshit | |
| 2022/0124001 | A1 | 4/2022 | Van Den Berghe | |
| 2022/0272006 | A1 * | 8/2022 | Saini | ................... H04L 41/0695 |
| 2022/0272033 | A1 * | 8/2022 | Jain | ....................... H04L 45/302 |
| 2022/0360528 | A1 * | 11/2022 | Jain | ......................... H04L 45/74 |
| 2022/0417287 | A1 * | 12/2022 | Joshi | ................... H04L 63/0236 |

(Continued)

OTHER PUBLICATIONS

Löcklin, Andreas, et al. "Digital twin for verification and validation of industrial automation systems—a survey." 2020 25th IEEE international conference on emerging technologies and factory automation (ETFA). vol. 1. IEEE. (Year: 2020).*

(Continued)

*Primary Examiner* — John M Macilwinen
(74) *Attorney, Agent, or Firm* — Lee & Hayes, P.C.

(57) ABSTRACT

In one embodiment, dynamic multi-cloud network provisioning is provided by an illustrative method comprising: identifying, by a process, source security groups associated with devices of a computer network; determining, by the process and based on observation of packets sourced from the devices, a set of destinations of the packets sourced from the devices; deducing, by the process, destination security groups associated with the devices based on the set of destinations used in the packets sourced from the devices; identifying, by the process, cloud services currently utilized by the devices based on the source security groups and the destination security groups; and establishing, by the process, a dynamic provisioning configuration for the computer network based on the cloud services currently utilized by the devices in the computer network.

20 Claims, 8 Drawing Sheets

(56) References Cited

U.S. PATENT DOCUMENTS

2023/0131255 A1 *  4/2023  Mortensen ............ H04L 43/026
                                                      370/235
2023/0336367 A1 *  10/2023  Panikkar .............. H04L 9/0894
2023/0336538 A1    10/2023  Eckstein et al.
2024/0118684 A1     4/2024  Mazur et al.

OTHER PUBLICATIONS

Khan, Talha Ahmed, et al. "Intent-based networking platform: An automated approach for policy and configuration of next-generation networks." Proceedings of the 36th Annual ACM Symposium on Applied Computing. (Year: 2021).*
Wang, T. English translation of CN_116614390_A_I. (Year: 2023).*
Farinacci, Dino, et al. "Rfc 6830: The locator/id separation protocol (lisp)." (Year: 2013).*

* cited by examiner

Device 200

Memory

242

Operating System

Functional Process(es)

240

246

220

Data Structures

Network Provisioning Process

248

Processor(s)

245

250 — Bus

215

210 — Network Interface(s)

I/O Interface(s)

Power Supply

260

DYNAMIC MULTI-CLOUD NETWORK PROVISIONING

TECHNICAL FIELD

The present disclosure relates generally to computer networks, and, more particularly, to dynamic multi-cloud network provisioning.

BACKGROUND

Configuration of network devices is automated today, either via central controllers or using open-source tools like Terraform, Ansible, and so on. Once configured, the device retains the same static configuration until the next change is implemented. For example, while configuring a wireless network there are many parameters that are statically configured today. Based on such configuration, wireless clients/devices are given a static treatment in the network to securely access the network services. Since it is a static configuration, this works for a pre-defined set of conditions and environments of clients/devices.

However, in today's smart networks with different kinds of user and Internet of Things (IoT) devices, the environment is not static but rather is dynamically changing as the number and/or types of clients and devices join and roam around the network. Moreover, the type of services these devices need to access via the network may also come via different cloud operators, known as multi-cloud networking. This is especially true for IoT devices as their operating conditions vary considerably based on the environment, as these IoT devices (e.g., sensors) are often deployed in harsh environments or outdoors.

In other words, networks are often consumed for different use cases, necessitating a dynamically changing network environment. For instance, not only are different services being utilized across networks over time, but many other elements of network operation are also dynamic, such as external factors impacting communication (e.g., physical or PHY communication influence), a number of devices, bandwidth requirements, performance requirements, service level agreements (SLAs), and so on. Associated network provisioning, therefore, needs to match this dynamicity, accordingly.

BRIEF DESCRIPTION OF THE DRA WINGS

The embodiments herein may be better understood by referring to the following description in conjunction with the accompanying drawings in which like reference numerals indicate identically or functionally similar elements, of which:

DESCRIPTION OF EXAMPLE EMBODIMENTS

Overview

According to one or more embodiments of the disclosure, dynamic multi-cloud network provisioning is provided. In particular, an illustrative method herein may comprise: identifying, by a process, source security groups associated with devices of a computer network; determining, by the process and based on observation of packets sourced from the devices, a set of destinations of the packets sourced from the devices; deducing, by the process, destination security groups associated with the devices based on the set of destinations used in the packets sourced from the devices; identifying, by the process, cloud services currently utilized by the devices based on the source security groups and the destination security groups; and establishing, by the process, a dynamic provisioning configuration for the computer network based on the cloud services currently utilized by the devices in the computer network.

In one embodiment, the illustrative method further comprises: establishing a digital twin of the computer network; testing the dynamic provisioning configuration on the digital twin; and releasing the dynamic provisioning configuration to the computer network based on an outcome of testing.

Other implementations are described below, and this overview is not meant to limit the scope of the present disclosure.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, and others. The Internet is an example of a WAN that connects disparate networks throughout the world, providing global communication between nodes on various networks. Other types of networks, such as field area networks (FANs), neighborhood area networks (NANs), personal area networks (PANs), enterprise networks, etc. may also make up the components of any given computer network. In addition, a Mobile Ad-Hoc Network (MANET) is a kind of wireless ad-hoc network, which is generally considered a self-configuring network of mobile routers (and associated hosts) connected by wireless links, the union of which forms an arbitrary topology.

Figure 1:
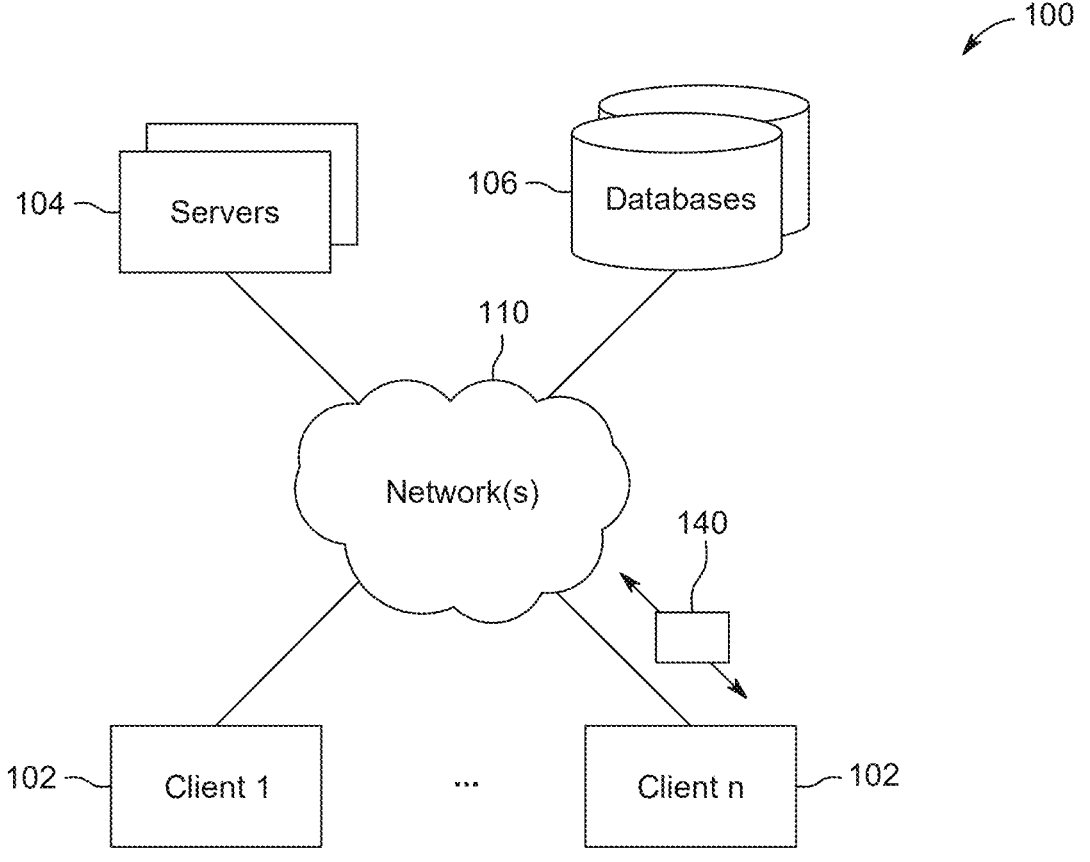
FIG. 1 illustrates an example computing system.

FIG. 1 is a schematic block diagram of an example simplified computing system (e.g., computing system 100) illustratively comprising any number of client devices (e.g., client devices 102, such as a first through nth client device), one or more servers (e.g., servers 104), and one or more databases (e.g., databases 106), where the devices may be in communication with one another via any number of networks (e.g., network(s) 110). The one or more networks (e.g., network(s) 110) may include, as would be appreciated, any number of specialized networking devices such as routers, switches, access points, etc., interconnected via wired and/or wireless connections. For example, the devices shown and/or the intermediary devices in network(s) 110 may communicate wirelessly via links based on WiFi, cellular, infrared, radio, near-field communication, satellite, or the like. Other such connections may use hardwired links, e.g., Ethernet, fiber optic, etc. The nodes/devices typically communicate over the network by exchanging discrete frames or packets of data (packets 140) according to predefined protocols, such as the Transmission Control Protocol/Internet Protocol (TCP/IP) other suitable data structures, protocols, and/or signals. In this context, a protocol consists of a set of rules defining how the nodes interact with each other.

Network(s) 110 may include, for example, network backbones or other internetworking systems, and may include various customer edge (CE) routers interconnected with provider edge (PE) routers in order to communicate across a core network to provide connectivity between devices which may be located in different geographical areas and/or on different types of local networks (e.g., local/branch networks versus data center/cloud environments). For example, these routers may be interconnected by the public Internet, a multiprotocol label switching (MPLS) virtual private network (VPN), or the like. In some implementations, a router or a set of routers may be connected to a private network (e.g., dedicated leased lines, an optical network, etc.) or a VPN (e.g., MPLS VPN) thanks to a carrier network, via one or more links exhibiting different network and service level agreement characteristics.

Client devices 102 may include any number of user devices or end point devices configured to interface with the techniques herein. For example, client devices 102 may include, but are not limited to, desktop computers, laptop computers, tablet devices, smart phones, wearable devices (e.g., heads up devices, smart watches, etc.), set-top devices, smart televisions, Internet of Things (IoT) devices, autonomous devices, or any other form of computing device capable of participating with other devices via network(s) 110.

Notably, in some implementations, servers 104 and/or databases 106, including any number of other suitable devices (e.g., firewalls, gateways, and so on) may be part of a cloud-based service. In such cases, the servers and/or databases 106 may represent the cloud-based device(s) that provide certain services described herein, and may be distributed, localized (e.g., on the premise of an enterprise, or "on prem"), or any combination of suitable configurations, as will be understood in the art. Servers 104, for example, may be configured as a network controller/supervisory service located in a data center with databases 106, accordingly. For instance, servers 104 may include, in various implementations, a network management server (NMS), a dynamic host configuration protocol (DHCP) server, a constrained application protocol (CoAP) server, an outage management system (OMS), an application policy infrastructure controller (APIC), an application server, etc.

Those skilled in the art will also understand that any number of nodes, devices, links, etc. may be used in computing system 100, and that the view shown herein is for simplicity. As would also be appreciated, computing system 100 may include any number of local networks, data centers, cloud environments, devices/nodes, servers, etc. Also, those skilled in the art will further understand that while the network is shown in a certain orientation, the computing system 100 is merely an example illustration that is not meant to limit the disclosure.

For instance, smart object networks, such as sensor networks, in particular, are a specific type of network (e.g., computing system 100) having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Generally, size and cost constraints on smart object nodes (e.g., sensors) result in corresponding constraints on resources such as energy, memory, computational speed and bandwidth.

In some implementations, the techniques herein may be applied to still other network topologies and configurations. For example, the techniques herein may be applied to peering points with high-speed links, data centers, etc.

Notably, web services can be used to provide communications between electronic and/or computing devices over a network, such as the Internet. A web site is an example of a type of web service. A web site is typically a set of related web pages that can be served from a web domain. A web site can be hosted on a web server. A publicly accessible web site can generally be accessed via a network, such as the Internet. The publicly accessible collection of web sites is generally referred to as the World Wide Web (WWW).

Also, cloud computing generally refers to the use of computing resources (e.g., hardware and software) that are delivered as a service over a network (e.g., typically, the Internet). Cloud computing includes using remote services to provide a user's data, software, and computation.

Moreover, distributed applications can generally be delivered using cloud computing techniques. For example, distributed applications can be provided using a cloud computing model, in which users are provided access to application software and databases over a network. The cloud providers generally manage the infrastructure and platforms (e.g., servers/appliances) on which the applications are executed. Various types of distributed applications can be provided as a cloud service or as a Software as a Service (SaaS) over a network, such as the Internet.

According to various implementations, a software-defined WAN (SD-WAN) may be used in computing system 100 to connect local networks and data center/cloud environments. In general, an SD-WAN uses a software defined networking (SDN)-based approach to instantiate tunnels on top of the physical network and control routing decisions, accordingly. For example, one tunnel may connect a customer edge (CE) router at the edge of a local network to router a remote CE router at the edge of a data center/cloud environment over an MPLS or Internet-based service provider network in a network backbone. Similarly, a second tunnel may also connect these routers over a 4G/5G/LTE cellular service provider network. SD-WAN techniques allow the WAN functions to be virtualized, essentially forming a virtual connection between local networks and data center/cloud environments on top of the various underlying connections. Another feature of SD-WAN is centralized management by a supervisory service that can monitor and adjust the various connections, as needed.

Figure 2:
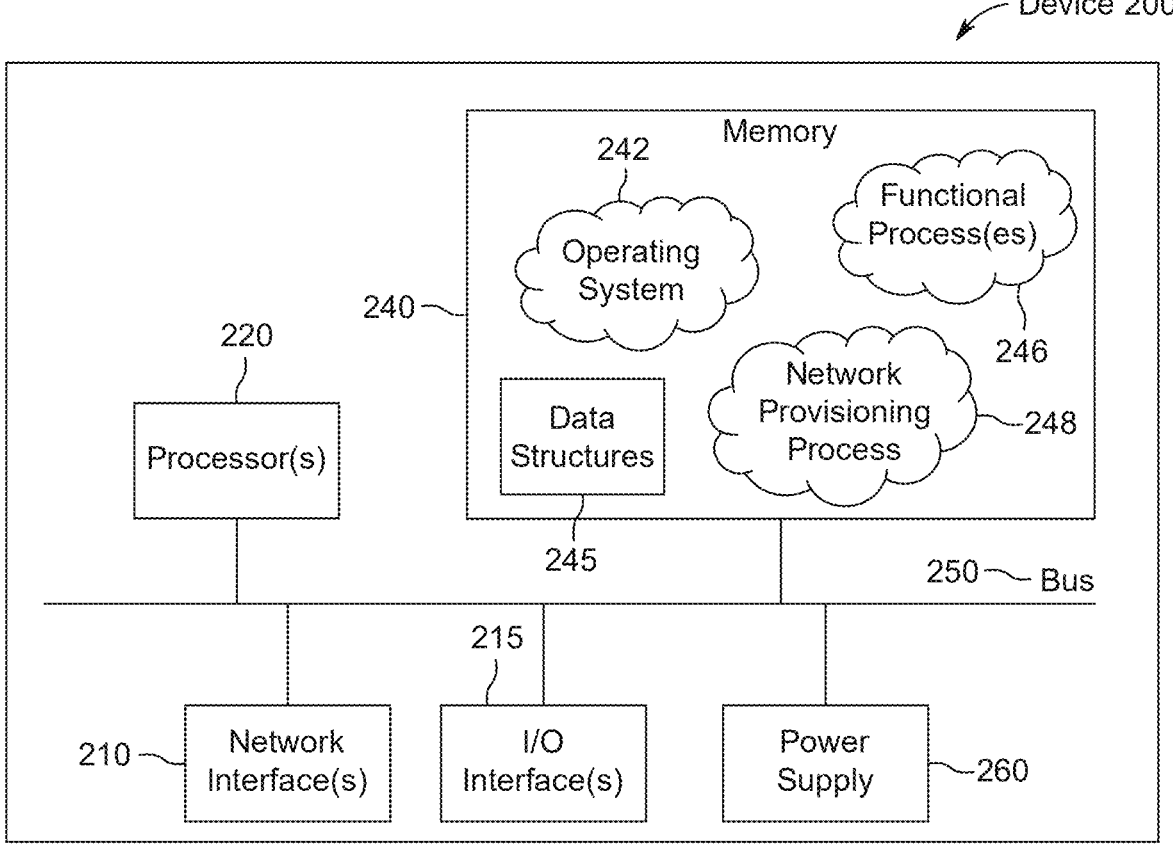
FIG. 2 illustrates an example network device/node.

FIG. 2 is a schematic block diagram of an example node/device 200 (e.g., an apparatus) that may be used with one or more implementations described herein, e.g., as any of the nodes or devices shown in FIG. 1 above or described in further detail below. The device 200 may comprise one or more of the network interfaces 210 (e.g., wired, wireless, etc.), input/output interfaces (I/O interfaces 215, inclusive of any associated peripheral devices such as displays, keyboards, cameras, microphones, speakers, etc.), at least one processor (e.g., processor(s) 220), and a memory 240 interconnected by a system bus 250, as well as a power supply 260 (e.g., battery, plug-in, etc.).

The network interfaces 210 include the mechanical, electrical, and signaling circuitry for communicating data over physical links coupled to the computing system 100. The network interfaces may be configured to transmit and/or receive data using a variety of different communication protocols. Notably, a physical network interface (e.g., network interfaces 210) may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor(s) 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise one or more functional processes 246, and on certain devices, a network provisioning process (process 248), as described herein, each of which may alternatively be located within individual network interfaces.

Notably, one or more functional processes 246, when executed by processor(s) 220, cause each device 200 to perform the various functions corresponding to the particular device's purpose and general configuration. For example, a router would be configured to operate as a router, a server would be configured to operate as a server, an access point (or gateway) would be configured to operate as an access point (or gateway), a client device would be configured to operate as a client device, and so on.

In various implementations, as detailed further below, one or more functional processes 246 and/or network provisioning process (process 248) may include computer executable instructions that, when executed by processor(s) 220, cause device 200 to perform the techniques described herein. To do so, in some implementations, one or more functional processes 246 and/or process 248 may utilize machine learning. In general, machine learning is concerned with the design and the development of techniques that take as input empirical data (such as network statistics and performance indicators) and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), model M can be used very easily to classify new data points. Often, M is a statistical model, and the cost function is inversely proportional to the likelihood of M, given the input data.

In various implementations, one or more functional processes 246 and/or process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that one or more functional processes 246 and/or process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, one or more functional processes 246 and/or process 248 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, one or more functional processes 246 and/or process 248 may use a generative model to generate synthetic network traffic based on existing user traffic to test how the network reacts. Example generative approaches can include, but are not limited to, generative adversarial networks (GANs), large language models (LLMs), other transformer models, and the like. In some instances, one or more functional processes 246 and/or process 248 may be executed to intelligently route LLM workloads across executing nodes (e.g., communicatively connected GPUs clustered into domains).

The performance of a machine learning model can be evaluated in a number of ways based on the number of true positives, false positives, true negatives, and/or false negatives of the model. For example, the false positives of the model may refer to the number of times the model incorrectly predicted whether a network health status rule was violated. Conversely, the false negatives of the model may refer to the number of times the model predicted that a health status rule was not violated when, in fact, the rule was violated. True negatives and positives may refer to the number of times the model correctly predicted whether a rule was violated or not violated, respectively. Related to these measurements are the concepts of recall and precision. Generally, recall refers to the ratio of true positives to the sum of true positives and false negatives, which quantifies the sensitivity of the model. Similarly, precision refers to the ratio of true positives to the sum of true and false positives.

It will be apparent to those skilled in the art that other processor and memory types, including various computer-readable media, may be used to store and execute program instructions pertaining to the techniques described herein. Also, while the description illustrates various processes, it is expressly contemplated that various processes may be implemented as modules configured to operate in accordance with the techniques herein (e.g., according to the functionality of a similar process). Further, while processes may be shown and/or described separately, those skilled in the art will appreciate that processes may be routines or modules within other processes.

—Dynamic Multi-Cloud Network Provisioning—

As noted above, configuration of network devices is automated today via central controllers or open-source tools, where the device retains the same static configuration for a pre-defined set of conditions and environments of clients/devices until the next change is implemented. However, today's smart networks are dynamically changing as the number and/or types of clients and devices join and roam around the network, particularly where the type of services these devices access come from different cloud operators in a multi-cloud networking environment.

That is, network environments are dynamically changing, as different services are utilized across networks over time as well as when other dynamic elements of network operation change, such as external factors impacting communication, a number of devices, bandwidth requirements, performance requirements, service level agreements (SLAs), and so on. Currently, while there are many available solutions for automated configuration of a network (e.g., Plug-and-Play or "PnP", controller pushed configuration, etc.), all such solutions are built to configure the network statically, according to either a user-provided configuration or a saved configuration based on a network profile.

The techniques herein, therefore, provide for dynamic multi-cloud network provisioning. In particular, an intelligent provisioning mechanism is described herein that dynamically changes, verifies, and optimizes the configuration of a device or group of devices based on a current multi-cloud services need and a current state of a network/operating environment. As described in greater detail below, this essentially is driven by dynamic feedback from the network devices to a provisioning server/controller, such that the controller, based on the current network conditions and services in use, optimizes, reconfigures, and guarantees the network operation. For instance, the techniques herein dynamically provision computer networks (e.g., multi-cloud networks) based on identifying the service from source and destination groups that the devices/hosts/servers belong to, and then applying the provisioning workflow, optionally utilizing a digital twin based verification and/or optimization procedure.

Specifically, according to one or more embodiments of the disclosure as described in detail below, an illustrative method herein may comprise: identifying, by a process, source security groups associated with devices of a computer network; determining, by the process and based on observation of packets sourced from the devices, a set of destinations of the packets sourced from the devices; deducing, by the process, destination security groups associated with the devices based on the set of destinations used in the packets sourced from the devices; identifying, by the process, cloud services currently utilized by the devices based on the source security groups and the destination security groups; and establishing, by the process, a dynamic provisioning configuration for the computer network based on the cloud services currently utilized by the devices in the computer network. In one embodiment, the illustrative method further comprises: establishing a digital twin of the computer network; testing the dynamic provisioning configuration on the digital twin; and releasing the dynamic provisioning configuration to the computer network based on an outcome of testing.

Notably, IoT devices and networks are becoming smarter and often AI/ML driven. As such, these advanced networks operate beyond traditional packet switching networks, interfacing with the Cloud securely to perform automated smart-telemetry-based operations. This telemetry data can be used in the network to for dynamic configuration, verification of the network (e.g., guaranteeing the performance as required using a digital twin before applying the configuration), and for further optimization over time.

Figure 3:
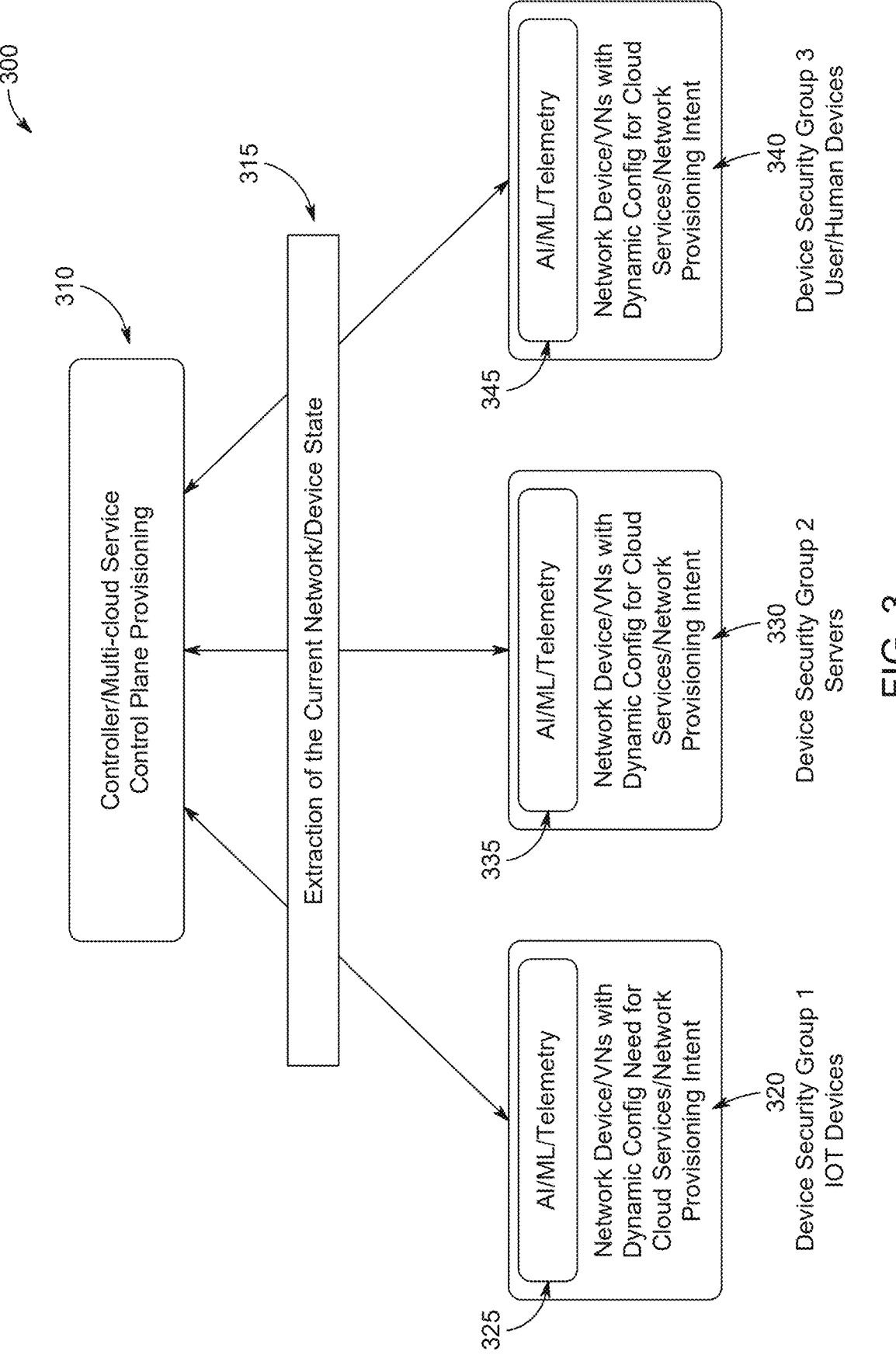
FIG. 3 illustrates an example of multi-cloud service control plane provisioning.

FIG. 3 illustrates an example high-level of a telemetry collection system 300 according to one or more embodiments of the present disclosure. For instance, within a computer network, such as a cloud infrastructure, multi-cloud environment, and so on, a controller 310 may be configured to perform multi-cloud service control plane (CP) provisioning herein by extracting the current network/device state, state 315, from different device security groups within the network. These network devices (or virtual nodes, VNs) may each have a dynamically configured need for cloud services, along with a network provisioning intent, as may be appreciated by those skilled in the art. As an illustration, device security group "1" may include IoT devices 320 that provide AI/ML/telemetry 325 as state 315 to the controller 310, device security group "2" may include servers 330 that provide AI/ML/telemetry 335, and device security group "3" may include user devices 340 that provide AI/ML/telemetry 345, accordingly. Other configurations and groupings may be made in accordance with the embodiments herein, and the simplified view in FIG. 3 is not meant to limit the scope of the present disclosure.

Figure 4:
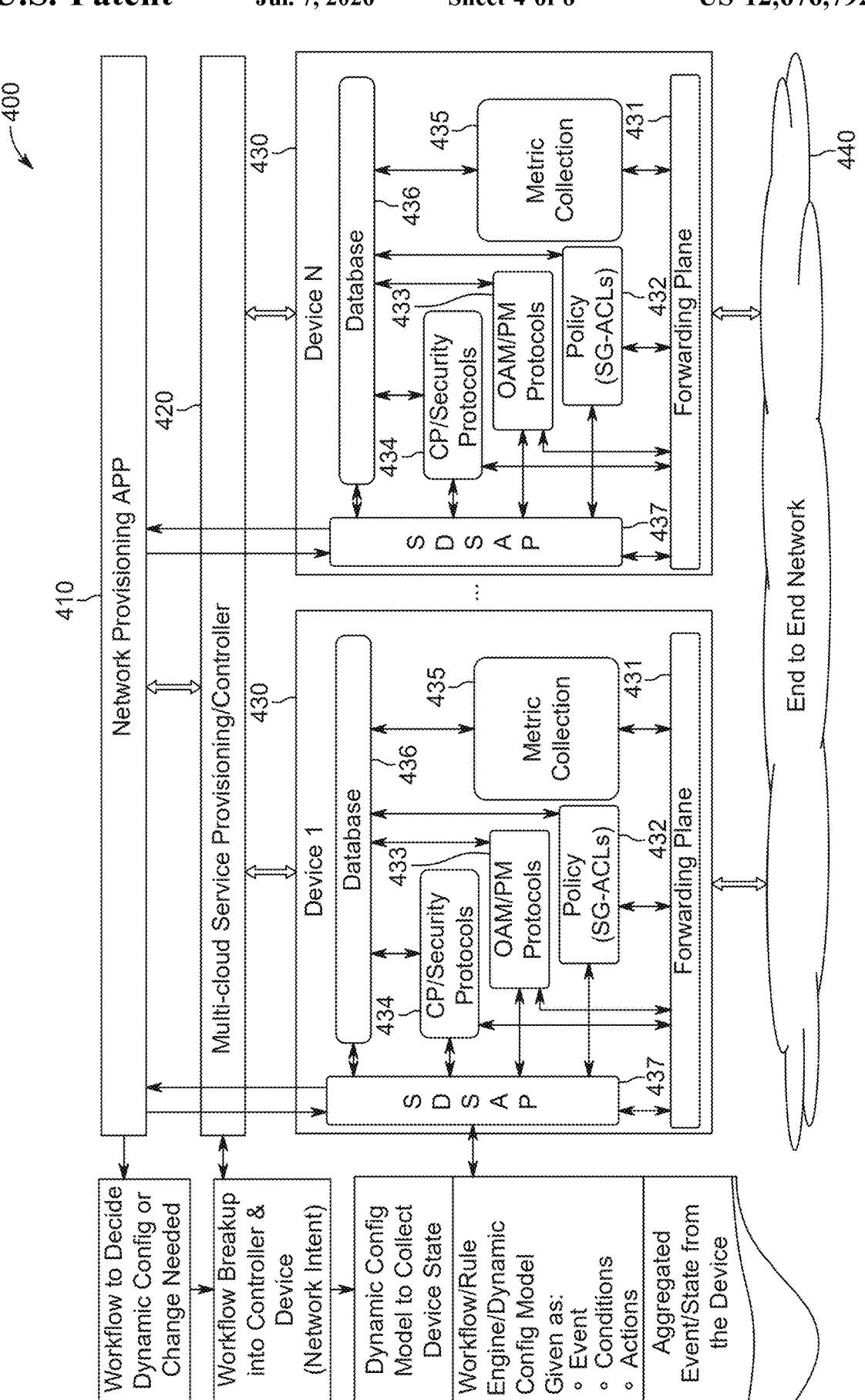
FIG. 4 illustrates an example of smart/dynamic network provisioning in telemetry-driven networks.

With reference to architecture 400 of FIG. 4, and as described in greater detail below, smart/dynamic network provisioning in AI/ML/Smart-Telemetry driven networks starts with a network provisioning application 410 on top of a multi-cloud service provisioning device, controller 420. The network provisioning application 410 is configured to perform end-to-end correlation to decide on needed configurations in the network, based on a workflow, while the controller provides automation, policy control, assurance, and AI/ML analytics for a number of devices, devices 430 (devices 1-N as shown) connected to an end-to-end network 440.

The devices 430 themselves have a number of operational components as will be appreciated by those skilled in the art, such as a forwarding plane 431, policies 432 (e.g., security group access control lists, SG-ACLs), Operations, Administration and Management (OAM) performance monitoring (PM) protocols 433 (e.g., Viptela BFD, iOAM, NG-OAM, etc., as will be understood in the art), control plane (CP) security protocols 434, metric collection 435 (e.g., Netflow and/or switched port analyzers (SPAN) from Cisco Systems, other stats and metrics, and so on), and a database 436 for collection of the streaming telemetry/full time telemetry (FTT), infrastructure configurations and operational parameters. These can all feed information into a source/destination service access point (SD-SAP 437), which acts as a passthrough for data between the device and higher-level communication support (through to network provisioning application 410).

According to the techniques described in greater detail below, the network provisioning application 410 decides on whether there are dynamic configurations or changes needed in the network, where the controller 420 breaks the workflow into controller and devices, as associated with network intent, accordingly. After establishing a dynamic configuration model to collect device state, SD-SAP 437 can be given the appropriate workflow/RuleEngine/Dynamic configuration model as events, conditions, and/or actions, based on an aggregated event/state from the device.

The techniques herein relate to a system and method for dynamic multi-cloud network provisioning using intelligent workflows to identify, configure, and optimize network resources in real-time. The system operates across both local device (IoT Edge/Switch) and controller (global) levels, leveraging AI/ML-driven digital twins, source and destination group tags (SGT/DGT), and telemetry data to ensure optimal service delivery and seamless scaling across multi-cloud environments.

Figure 5A:
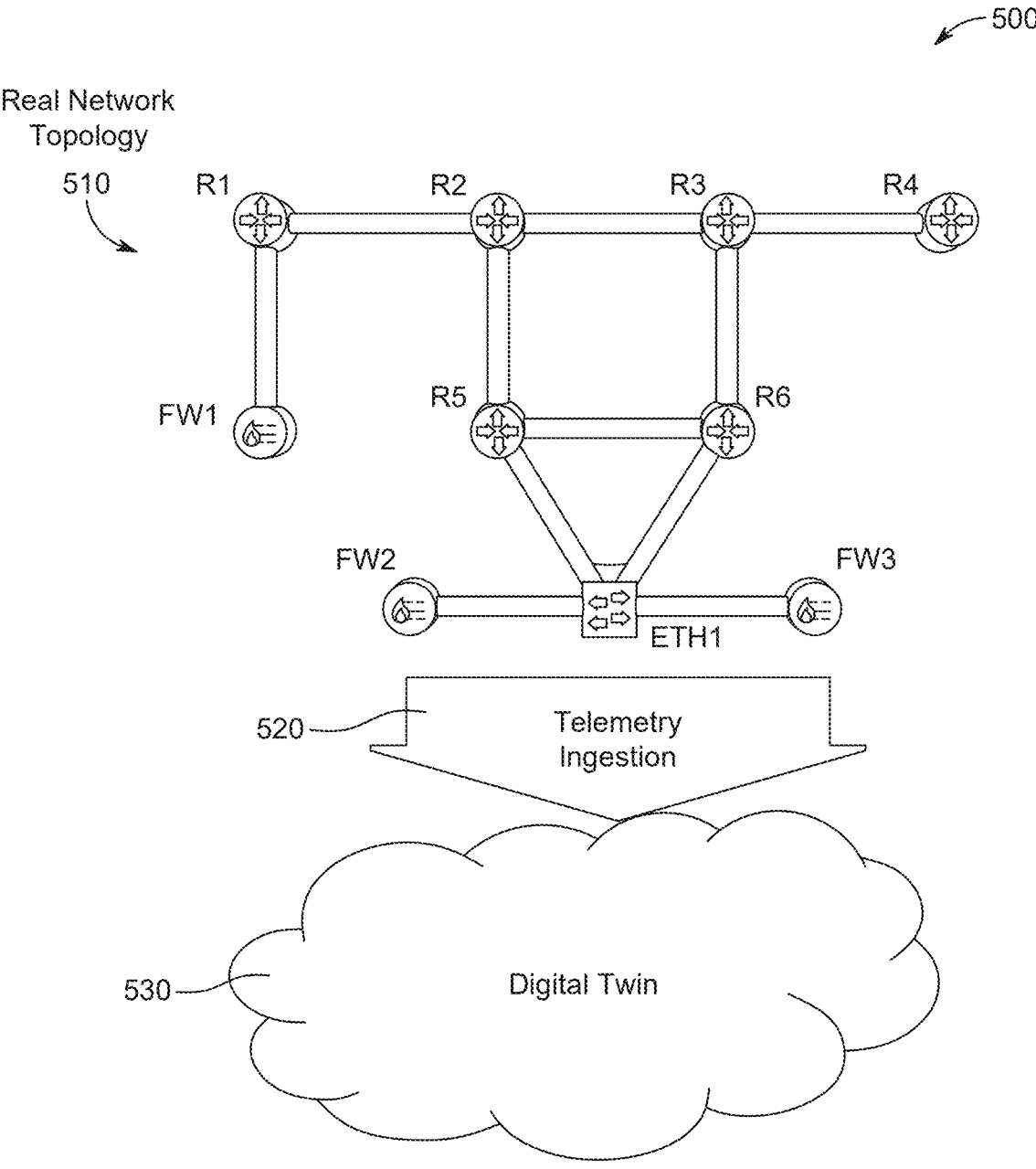
FIGS. 5A-5B illustrate an example of telemetry ingestion and digital twin testing for dynamic network provisioning.
Figure 5B:
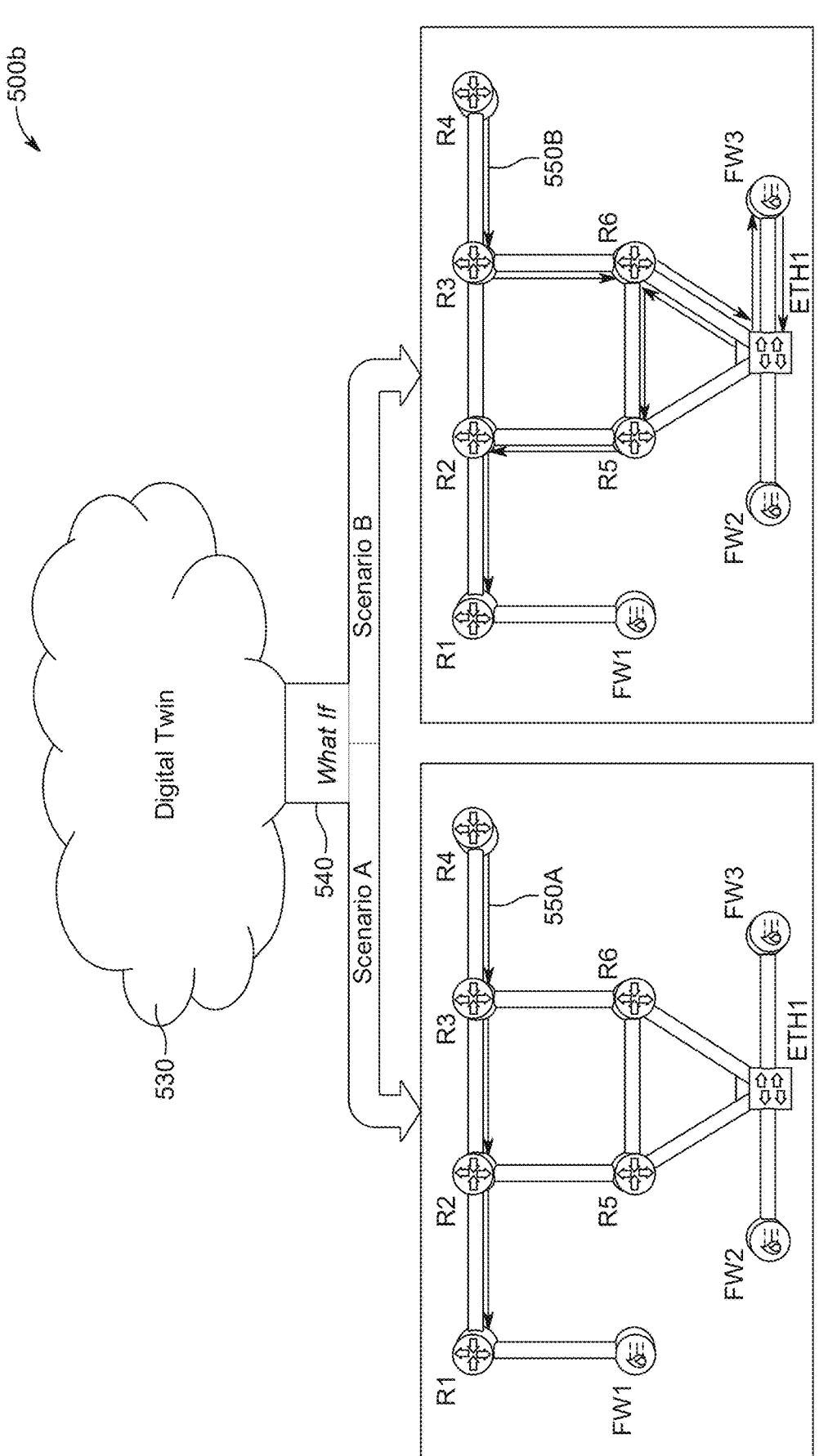

For example, FIG. 5A illustrates an example 500*a* where a real network topology 510 is known, such as routers "R1-R6", firewalls "FW1-FW3", switches "ETH1", and so on, may be interconnected through various links and configurations, as will be appreciated by those skilled in the art. Through telemetry ingestion 520 as described herein, a provisioning process may input the real topology and telemetry into a digital twin 530. As shown then in example 500*b* of FIG. 5B, the digital twin 530 may be used to perform "what if" scenarios 540 on the telemetry data and the real network topology 510 in order to determine expected behaviors, such as expected behavior 550A and expected behavior 550B, accordingly.

Operationally, the techniques herein begin with a data modeling and defining workflow. Specifically, the techniques herein define a smart configuration workflow designed to observe and identify the network environment and state from two perspectives: the device or node level and the global controller level. This dual-perspective approach enables the determination of dynamic network configuration updates required to optimize network use and ensure access to the necessary cloud services based on the real-time state of the network.

The techniques herein are also specifically directed to identifying cloud services based on the source and destination security groups (group tags), i.e., SGT and DGT, and to use this identification to determine the dynamic provisioning requirements for those services.

Upon onboarding a client or device, the system assigns a source security group (IP-SGT binding) based on the user credentials and assigned IP address. When the client/device initiates a packet to a destination, the system queries the destination security group (DGT) from the service control plane (e.g., LISP map-server). This query mechanism is supported by existing solutions like SDA/Hawkeye (or Secure Service Insertion, SSI) but is utilized here to identify cloud services and facilitate dynamic provisioning.

Based on source and destination group tags (SGT and DGT), the cloud service is identified to determine the device's dynamic provisioning need using the defined workflow.

To determine and optimize dynamic provisioning and verification based on identified cloud service, the associated workflow is divided into two main components: an IoT edge/switch workflow, and a controller workflow.

The IoT edge/switch workflow operates directly on edge devices (e.g., Cisco IE/IR routers and switches). It receives provisioning intent from the controller, determines a dynamic configuration model, and aggregates relevant device states for each identified cloud service. Parameters like the identified cloud service, number of clients, bandwidth consumption, link status, and device capacity (e.g., CPU power) are gathered. Using this data, the workflow identifies the operational state of each device and determines the necessary dynamic configuration updates. That is, each device as part of the dynamic configuration model would define the device operation/state objects to aggregate to determine the state of the device for dynamic configuration, accordingly.

For example, an IoT Edge switch may have certain ASIC capacity/CPU power and it needs to support a certain number of network users with certain bandwidth consumption requirements, then all requirements at device level would be aggregated at the SD-SAP in the networking device. The SD-SAP on the device would know these parameters from the network intent, and would get network device state objects from the device's dynamic configuration model to aggregate and generate device state to identify the workflow at the device.

Regarding the controller workflow, the controller manages the overall network state by aggregating data from individual devices, leveraging AI/ML models, and using telemetry data. This enables the controller to correlate end-to-end network conditions, assess Service Level Agreement (SLA) requirements, and generate potential dynamic configuration changes, modifying the network intent for each device based thereon.

The controller may illustratively simulate these changes using a digital twin to validate the impact before applying them to the network, as shown above in FIG. 5A. This validation ensures that network updates will not disrupt current operations. That is, the techniques herein may generate a network wide configuration to try on a digital twin to run "what-if" scenarios, allowing the controller to adjust traffic flow, reroute based on SGT/DGT, and fine-tune load balancing across cloud services using optimization algorithms. For instance, in one embodiment, to solve the optimization problem, the controller can leverage a genetic algorithm where all the variables are expressed as genes, and the algorithm selects the genes (e.g., the reroute paths) that optimize the match with the intent. Note, too, that the techniques herein may also reroute some flows based on SGT and DGT by forcing different encapsulations.

Notably, the intent of the customer is a certain SLA for certain flows, where the SLA may be expressed in, for example, loss and latency, and the flows may be expressed in offered volumes, shapes, QoS, ingress and egress points, and so on. The offered volume may be more than what the network currently achieves for these flows because of a lack of optimization. To optimize and reach the intent, the digital twin may play between the ratio of volumes that are sent to the egress points by moving the workload and tuning the load balancing to the different workload locations.

If a successful optimization is determined, the techniques herein may then apply the changes to each device or group of devices in the network.

Figure 6:
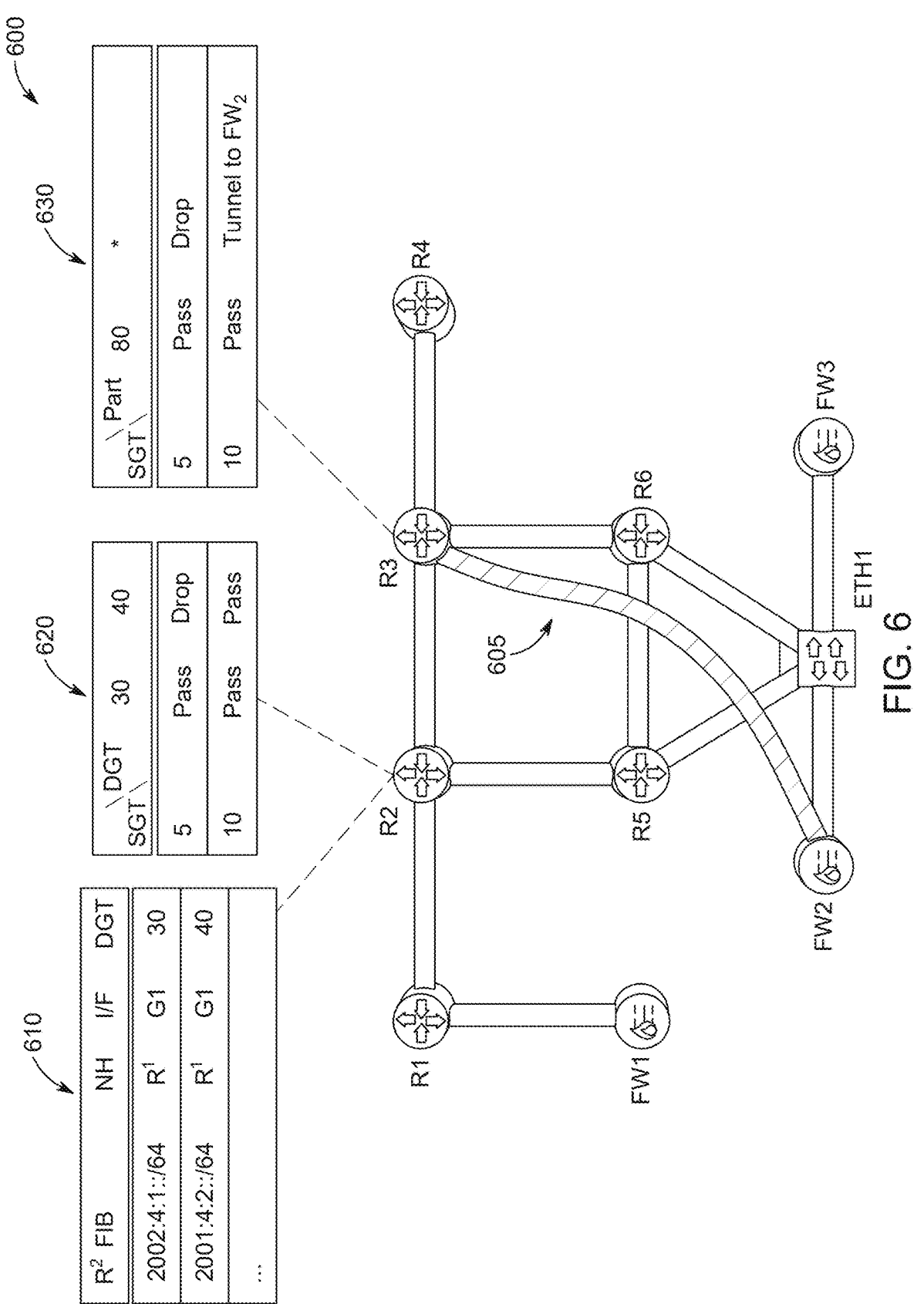
FIG. 6 illustrates an example of dynamic provisioning configuration in a computer network.

FIG. 6 illustrates an example 600 of the computer network with adjusted configuration to affect traffic flow according to SGT/DGT and network intent, accordingly. For instance, assume a forwarding information base (FIB) on R2, or R2 FIB 610, illustrating various IP prefixes (e.g., 2002:4:1::/64 and 2001:4:1::/64), each with next hop (NH) R1 on interface (I/F) "G1". The first prefix is shown as being used with DGT "30", while the second prefix is shown with DGT "40". As shown in SGT/DGT table 620, SGT 5 and DGT 30 passes through, while SGT 5 and DGT 40 is dropped. SGT 10 for both DGT 30 and DGT 40 are both passed. Furthermore, as shown in SGT/Port table 630, SGT 5 and Port 80 passes through, while SGT 5 and any other Port ("*") is dropped. SGT 10 for Port 80 is passed, but SGT 10 for the rest of the ports may be forwarded onto a tunnel 605 to FW2 for processing. Other configurations may be made, and those skilled in the art will understand that FIG. 6 is merely a simplified example to demonstrate various aspects of the techniques herein.

Notably, by combining workflows (for determining operational state at the device and for end-to-end correlation of the network-wide state at the controller), the device-level and controller-level workflows work in tandem to determine dynamic changes in network provisioning needs, and to correspondingly update network configurations at the devices, accordingly. For example, if telemetry data from the controller indicates that access node A is overloaded while access node B is underutilized, the controller can trigger a redistribution of users between the nodes. This redistribution is performed based on the capacity and real-time state of each access node, as well as the specific cloud services being accessed by users.

As an example use case, consider a scenario where the controller knows the topology of the network. Based on the topology, as part of the workflow at the controller, the network provisioning application would collect states from the individual devices (coordinating with the SD-SAP device workflow on each device). The controller workflow would then aggregate/correlate this information using the known topology in order for the network provisioning application to determine any dynamic change in the configuration.

Assume, for instance, that an access node A has "n" wireless users/devices connected, while an access node B has capacity for "n" users but currently has no active user connections. Both nodes are facilitating access to required cloud services. The network provisioning application, through collected telemetry data at the controller, identifies this imbalance in the distribution of clients. (It already knows the capacity of each node based on the provisioning parameters and licenses available for the cloud services.) That is, based on the telemetry data and current configuration, the provisioning application detects the overload on node A and underutilization on node B and decides that a dynamic update would be needed to distribute the user load to different nodes to access cloud services efficiently.

Using the defined workflow, therefore, the network provisioning application may trigger a dynamic configuration change, such that network devices begin distributing "n/2" users to each access node. This adjustment might involve provisioning new cloud services (e.g., access control, QoS, etc.) on the network device nodes for the redistributed users. Also, since these dynamic changes happen in a live network, to make sure the configuration changes will not bring down the network, digital twin is used to validate the impact (operation) of network configuration change before it is enabled, ensuring that network performance remains stable during the update.

Showcasing specifically how this example may apply to mobility, assume still that "n" number of clients are connected via an access node and are accessing cloud services from a provider. Now assume that this cloud service only has capacity/license for "n" users. When another "m" users join/move to this access node, there would be a need to provision another service (maybe via a different cloud/ service provider using the same or different node), and this new service provisioning would be part of the dynamic update. Note, too, that another way for wireless users to be redistributed could be through transmitted power control provisioning on access nodes in order to force redistribution of the users.

While the examples above discuss moving users to one other node, the techniques herein may also determine optimality beyond mere offloading, such as to provision a plurality of additional devices according to dynamic needs of a network. For instance, assume that a single server is servicing email for a given client, such that the email service in a public cloud is seen as a single IPV6 address (e.g., "2002:1:1::1"). Through the techniques herein, certain users (e.g., 50% as in the example above) may be rerouted (e.g., based on ACLs) to any number of needed servers, such as three servers in a private cloud (e.g., with illustrative IPV6 addresses "2002:4:1::1", "2002:4:1::12", and "2002:4:1::1", for example).

Notably, in one embodiment of the present disclosure, based on the SGT and DGT of the traffic flows and intelligent telemetry, the networking node itself may determine which cloud services are being accessed by the node. This may then auto-trigger a workflow on the device (e.g., at the SD-SAP level) to dynamically provision new cloud services required for the users on each node. This dynamic device-controlled auto provisioning would help in scaling (as opposed to pushing the configuration from the application, which is more difficult to scale in such dynamically changing scenarios).

In another embodiment, the global knowledge/update of the devices/hosts at controller would let provisioning applications decide on which devices the SD-SAP workflow should be triggered (with required parameters from controller). This is to reevaluate device state (e.g. number of users accessing which cloud services, based on SGT/DGT) to facilitate dynamic config change. (Note, the application is not pushing the whole configuration change here.) Said differently, using the intelligence/telemetry described above, the workflows herein can determine the possibility of a dynamic configuration change in the network for different cloud services. This global knowledge of the devices at the controller would also let provisioning applications decide on which devices the SD-SAP level workflow needs to be triggered to reevaluate device state (based on intent change) to facilitate dynamic configuration change, accordingly.

In closing, the techniques herein provide a comprehensive solution for dynamic multi-cloud network provisioning, utilizing a novel integration of SGT/DGT-based service identification, AI/ML-driven workflows, and digital twin validation. By addressing the limitations of static configuration methods and providing real-time adaptability, the techniques herein represent a significant advancement in autonomous network management and optimization for complex, multi-cloud environments.

Figure 7:
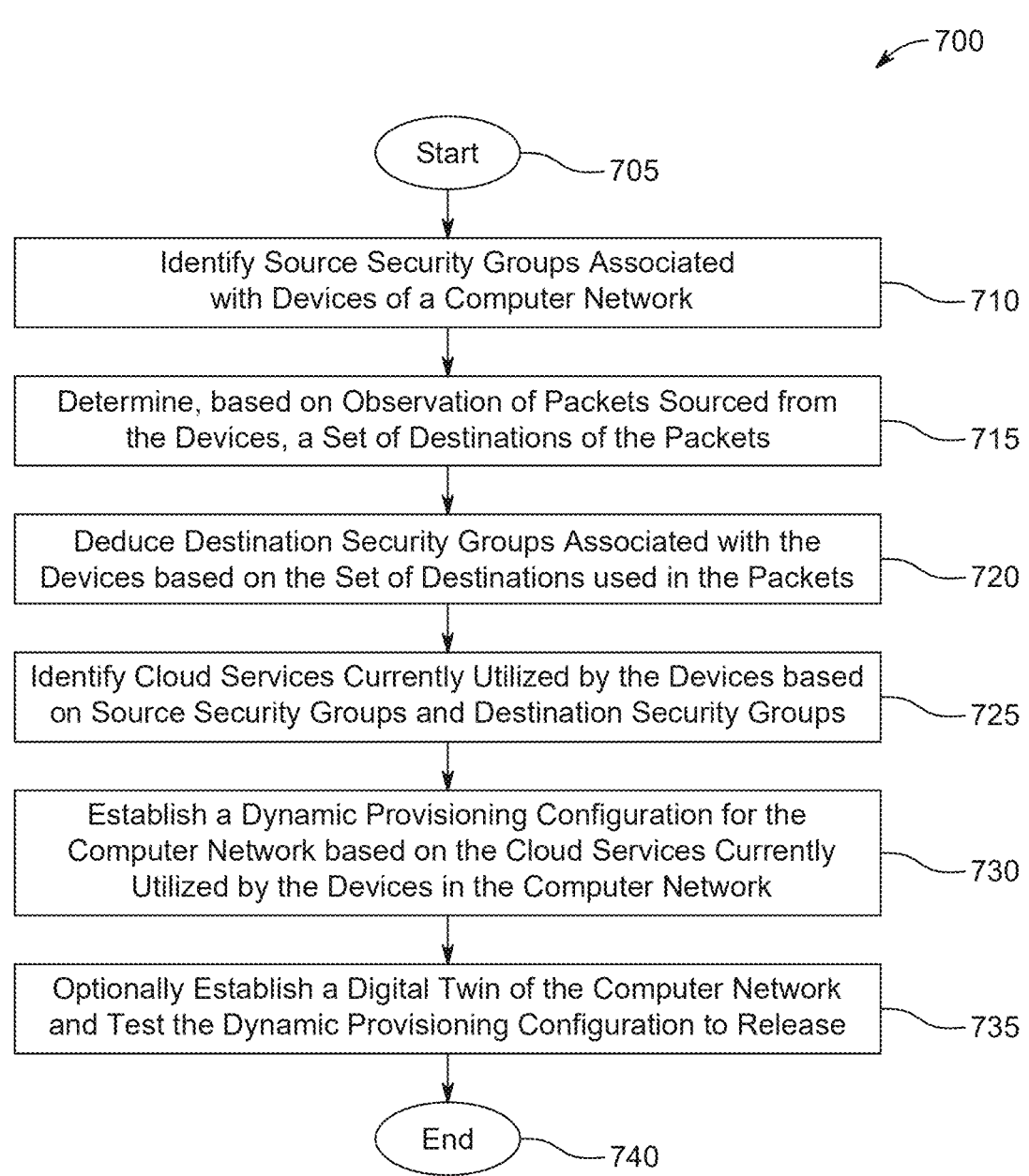
FIG. 7 illustrates an example procedure for dynamic multi-cloud network provisioning.

FIG. 7 illustrates an example simplified procedure for dynamic multi-cloud network provisioning in accordance with one or more embodiments described herein, particularly from the perspective of a controller or other network provisioning device. For example, a non-generic, specifically configured device (e.g., device 200, an apparatus) may perform procedure 700 by executing stored instructions (e.g., process 248). The procedure 700 may start at step 705, e.g., triggered based on occurrence of a threshold-based event. For instance, changes at scale happen when major/bulk events happen in the network (e.g., switchover, mass clients/services move, etc.). Single user/device state changes may not trigger the dynamic provisioning update herein, however multiple clients joining/leaving/moving at a same time could create a combined state (e.g., congestion or limited access) which would necessitate a dynamic update of provisioning and distribution of the load, accordingly.

Procedure 700 continues to step 710, where, as described in greater detail above, the techniques herein identify source security groups (e.g., source group tags, "SGTs") associated with devices of a computer network. As mentioned, this may be based on IP addresses and credentials of the devices, and may occur during onboarding of the devices.

In step 715, the techniques herein may then determine, based on observation of packets sourced from the devices, a set of destinations of the packets sourced from the devices. In step 720, based on the set of destinations used in the packets sourced from the devices, the techniques herein may then deduce destination security groups (e.g., destination group tags, "DGTs") associated with the devices. For instance, as mentioned above, this may be accomplished by querying a service control plane (e.g., using a Locator ID Separation Protocol (LISP) map server query) for the destination security groups according to at least the set of destinations used in the packets sourced from the devices.

Now, in step 725, the techniques herein may identify cloud services (e.g., multi-cloud services or otherwise) currently utilized by the devices based on the source security groups and the destination security groups. As such, in step 730, the techniques herein may then establish a dynamic provisioning configuration for the computer network based on the cloud services currently utilized by the devices in the computer network, accordingly. Provisioning the computer network may be based on setting a corresponding network intent on network resource devices that provide the cloud services.

Notably, establishing the dynamic provisioning configuration may be based on determining operational workflow state of network resource devices that provide the cloud services (e.g., a number of connected clients, a bandwidth consumption, link states, processing capacity and utilization, or memory capacity and utilization, etc.), and/or based on determining an end-to-end network state for the cloud services (e.g., from collecting telemetry data from the computer network).

In step 735, in certain embodiments, the techniques herein may also optionally establish a digital twin of the computer network to test the dynamic provisioning configuration on the digital twin, releasing the dynamic provisioning configuration to the computer network based on an outcome of testing. That is, as described above, the techniques herein may employ a digital twin as a verification layer to simulate the impact of dynamic provisioning changes before applying them to the live network. This step is critical for ensuring that any adjustments, such as user redistribution or the provisioning of new cloud services, do not negatively impact network stability. Unlike previous solutions that focus on static or startup configuration validation, this approach continuously validates dynamic updates in real time.

In one embodiment, specifically, the digital twin may be tested by attempting a plurality of dynamic provisioning configurations on the digital twin to allow selection of a best configuration of the plurality of dynamic provisioning configurations based on compliance with a network provisioning intent. In another embodiment, the digital twin may be tested by applying a plurality of potential traffic scenarios on the digital twin in order to select a particular dynamic provisioning configuration that is most responsive to the plurality of potential traffic scenarios.

Procedure 700 may end at step 740, though may restart at any time to further optimize the dynamic provisioning configuration for the computer network, according to the techniques herein as described in detail above.

It should be noted that while certain steps within the procedures above may be optional as described above, the steps shown in the procedures above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures may have been described separately, certain steps from each procedure may be incorporated into each other procedure, and the procedures are not meant to be mutually exclusive.

In some implementations, an illustrative method herein may comprise: identifying, by a process, source security groups associated with devices of a computer network; determining, by the process and based on observation of packets sourced from the devices, a set of destinations of the packets sourced from the devices; deducing, by the process, destination security groups associated with the devices based on the set of destinations used in the packets sourced from the devices; identifying, by the process, cloud services currently utilized by the devices based on the source security groups and the destination security groups; and establishing, by the process, a dynamic provisioning configuration for the computer network based on the cloud services currently utilized by the devices in the computer network.

In one embodiment, the method further comprises: determining operational workflow state of network resource devices that provide the cloud services; and determining the dynamic provisioning configuration for the computer network based on the operational workflow state of the network resource devices. In one embodiment, the operational workflow state is based on one or more of: a number of connected clients, a bandwidth consumption, link states, processing capacity and utilization, or memory capacity and utilization.

In one embodiment, the method further comprises: establishing a digital twin of the computer network; testing the dynamic provisioning configuration on the digital twin; and releasing the dynamic provisioning configuration to the computer network based on an outcome of testing. In one embodiment, testing comprises: attempting a plurality of dynamic provisioning configurations on the digital twin; and selecting a best configuration of the plurality of dynamic provisioning configurations based on compliance with a network provisioning intent. In one embodiment, testing comprises: applying a plurality of potential traffic scenarios on the digital twin; and selecting a particular dynamic provisioning configuration that is most responsive to the plurality of potential traffic scenarios.

In one embodiment, the method further comprises: provisioning the computer network based on the dynamic provisioning configuration by setting a corresponding network intent on network resource devices that provide the cloud services.

In one embodiment, the method further comprises: determining an end-to-end network state for the cloud services; and determining the dynamic provisioning configuration for the computer network based on the end-to-end network state. In one embodiment, the method further comprises: collecting telemetry data from the computer network for use in determining the end-to-end network state for the cloud services.

In one embodiment, the source security groups correspond to source group tags (SGTs), and the destination security groups correspond to destination group tags (DGTs).

In one embodiment, identifying the source security groups is based on network addresses and credentials of the devices.

In one embodiment, identifying the source security groups occurs during onboarding of the devices to the computer network.

In one embodiment, identifying the destination security groups comprises: querying a service control plane for the destination security groups according to at least the set of destinations used in the packets sourced from the devices. In one embodiment, querying comprises a Locator ID Separation Protocol (LISP) map server query.

In one embodiment, the cloud services comprise multi-cloud services.

In one embodiment, the method further comprises: triggering establishment of the dynamic provisioning configuration based on occurrence of a threshold-based event.

In some implementations, an illustrative apparatus herein may comprise: one or more network interfaces to communicate with a network; a processor coupled to the one or more network interfaces and configured to execute one or more processes; and a memory configured to store a process that is executable by the processor, the process comprising: identifying source security groups associated with devices of a computer network; determining, based on observation of packets sourced from the devices, a set of destinations of the packets sourced from the devices; deducing destination security groups associated with the devices based on the set of destinations used in the packets sourced from the devices; identifying cloud services currently utilized by the devices based on the source security groups and the destination security groups; and establishing a dynamic provisioning configuration for the computer network based on the cloud services currently utilized by the devices in the computer network.

In still other implementations, a tangible, non-transitory, computer-readable medium storing program instructions that cause a device to execute a process comprising: identifying source security groups associated with devices of a computer network; determining, based on observation of packets sourced from the devices, a set of destinations of the packets sourced from the devices; deducing destination security groups associated with the devices based on the set of destinations used in the packets sourced from the devices; identifying cloud services currently utilized by the devices based on the source security groups and the destination security groups; and establishing a dynamic provisioning configuration for the computer network based on the cloud services currently utilized by the devices in the computer network.

The techniques described herein, therefore, provide for dynamic multi-cloud network provisioning. In particular, the techniques herein offer several advancements over existing technologies, uniquely facilitating dynamic provisioning across multi-cloud environments, intelligently adjusting to changes in the services used by devices. Unlike previous solutions, the techniques herein leverage dynamic service identification through source and destination group tags (SGT/DGT), allowing for real-time adaptation to user needs. This adaptability is coupled with an AI/ML-driven digital twin that serves as a validation layer, ensuring new configurations integrate seamlessly without disrupting existing operations.

The current state of digital twins focus on static configurations, user-driven updates, or adapting to changes in physical assets. The techniques herein, however, use digital twins specifically for validating dynamic provisioning changes before deploying them. This validation process occurs across the entire network and is not merely about adjusting to physical asset changes but ensuring that new service provisions meet current network demands without causing disruptions.

Moreover, current multi-cloud environments or provisioning lack mechanisms to intelligently adjust based on service demands. The techniques herein detect and analyze SGT/DGT from traffic flows to determine what cloud services are being accessed by devices. This analysis triggers an auto-provisioning workflow directly on the devices, adjusting network configurations in real-time to meet emerging needs. Such dynamic responsiveness is not found in prior solutions, which tend to rely on more rigid provisioning methods. Current process for onboarding devices to cloud services or using digital twins for industrial automation fall short of addressing the dynamic nature of changing service needs across multi-cloud networks. The techniques herein focus on real-time service identification and provisioning, based on group tags, thus providing a more responsive solution to adapting to new service requirements, ensuring that the network remains optimized for current use without manual intervention.

Additionally, unlike Plug-and-Play (PnP) approaches, which push static configurations from external controllers, the techniques herein auto-adjust configurations based on the real-time detection of services being accessed. Also, traditional telemetry-based configuration pushes can struggle with scalability in large networks. Here, the auto-provisioning is initiated directly on the device, leveraging SGT/DGT data, making it more scalable and responsive to dynamic needs.

The use of a digital twin to validate these dynamic provisioning changes across the entire network before they go live ensures robust, uninterrupted network operations. This is notably different from startup or boot-up configuration validation, offering a more proactive and continuous validation method.

Accordingly, the techniques herein advantageously provide seamless integration of SGT/DGT-based service identification with dynamic provisioning, coupled with a digital twin-based validation layer, ensuring that changes are intelligently triggered and verified, reducing the risk of errors and maintaining optimal performance. Existing technologies do not provide this level of intelligence in detecting service use or the same robust mechanism for validating dynamic provisioning across an enterprise/IoT network.

Specifically, the techniques herein provide numerous advantages over the current state of technology in this field. In particular, unlike existing static provisioning methods or telemetry-based configuration pushes that struggle to scale in large networks, the techniques herein dynamically identify cloud services based on SGT/DGT and automatically adjusts provisioning on the device itself. This enables real-time, in-device provisioning that scales effectively with changes in network demand. Also, the combination of device-level workflows and global controller correlation enables comprehensive network optimization, where the ability to simulate changes using digital twins before applying them ensures minimal disruption and continuous adherence to SLA requirements. Further, by utilizing genetic algorithms and telemetry data, the controller can optimize network configurations, adjusting traffic flows and balancing loads dynamically across different cloud services. This goes beyond traditional digital twin applications, which typically focus on static models or limited use cases in industrial automation or IoT onboarding. The techniques herein leverage in-device intelligence and smart workflows for provisioning based on real-time network states, enabling autonomous network management that scales effectively as network demands evolve. This allows for efficient handling of major events like switchover or mass user movements, ensuring optimal performance across diverse multi-cloud environments.

Illustratively, the techniques described herein may be performed by hardware, software, and/or firmware, (e.g., an "apparatus") such as in accordance with the network provisioning process, process 248, e.g., a "method"), which may include computer-executable instructions executed by the processor(s) 220 to perform functions relating to the techniques described herein, e.g., in conjunction with corresponding processes of other devices in the computer network as described herein (e.g., on agents, controllers, computing devices, servers, etc.). In addition, the components herein may be implemented on a singular device or in a distributed manner, in which case the combination of executing devices can be viewed as their own singular "device" for purposes of executing the process (e.g., process 248).

While there have been shown and described illustrative implementations above, it is to be understood that various other adaptations and modifications may be made within the scope of the implementations herein. For example, while certain implementations are described herein with respect to certain types of networks in particular, the techniques are not limited as such and may be used with any computer network, generally, in other implementations. Moreover, while specific technologies, protocols, architectures, schemes, workloads, languages, etc., and associated devices have been shown, other suitable alternatives may be implemented in accordance with the techniques described above. In particular, while the description mentions multi-cloud environment, other types of networks with any associated workflows may utilize the techniques herein for network provisioning, accordingly. In addition, while certain devices are shown, and with certain functionality being performed on certain devices, other suitable devices and process locations may be used, accordingly. Also, while certain embodiments are described herein with respect to using certain models for particular purposes, the models are not limited as such and may be used for other functions, in other embodiments.

Moreover, while the present disclosure contains many other specifics, these should not be construed as limitations on the scope of any implementation or of what may be claimed, but rather as descriptions of features that may be specific to particular implementations. Certain features that are described in this document in the context of separate implementations can also be implemented in combination in a single implementation. Conversely, various features that are described in the context of a single implementation can also be implemented in multiple implementations separately or in any suitable sub-combination. Further, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the implementations described in the present disclosure should not be understood as requiring such separation in all implementations.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true intent and scope of the implementations herein.

What is claimed is:

1. A method, comprising:

identifying, by a process, source security groups associated with devices of a computer network;

determining, by the process and based on observation of packets sourced from the devices, a set of destinations of the packets sourced from the devices;

deducing, by the process, destination security groups associated with the devices based on the set of destinations used in the packets sourced from the devices;

identifying, by the process, cloud services currently utilized by the devices based on the source security groups and the destination security groups; and establishing, by the process, a dynamic provisioning configuration for the computer network based on the cloud services currently utilized by the devices in the computer network.

2. The method of claim 1, further comprising:

determining operational workflow state of network resource devices that provide the cloud services; and determining the dynamic provisioning configuration for the computer network based on the operational workflow state of the network resource devices.

3. The method of claim 2, wherein the operational workflow state is based on one or more of: a number of connected clients, a bandwidth consumption, link states, processing capacity and utilization, or memory capacity and utilization.

4. The method of claim 1, further comprising:

establishing a digital twin of the computer network;

testing the dynamic provisioning configuration on the digital twin; and releasing the dynamic provisioning configuration to the computer network based on an outcome of testing.

5. The method of claim 4, wherein testing comprises:

attempting a plurality of dynamic provisioning configurations on the digital twin; and selecting a best configuration of the plurality of dynamic provisioning configurations based on compliance with a network provisioning intent.

6. The method of claim 4, wherein testing comprises:

applying a plurality of potential traffic scenarios on the digital twin; and selecting a particular dynamic provisioning configuration that is most responsive to the plurality of potential traffic scenarios.

7. The method of claim 1, further comprising:

provisioning the computer network based on the dynamic provisioning configuration by setting a corresponding network intent on network resource devices that provide the cloud services.

8. The method of claim 1, further comprising:

determining an end-to-end network state for the cloud services; and determining the dynamic provisioning configuration for the computer network based on the end-to-end network state.

9. The method of claim 8, further comprising:

collecting telemetry data from the computer network for use in determining the end-to-end network state for the cloud services.

10. The method of claim 1, wherein the source security groups correspond to source group tags (SGTs), and the destination security groups correspond to destination group tags (DGTs).

11. The method of claim 1, wherein identifying the source security groups is based on network addresses and credentials of the devices.

12. The method of claim 1, wherein identifying the source security groups occurs during onboarding of the devices to the computer network.

13. The method of claim 1, wherein identifying the destination security groups comprises:

querying a service control plane for the destination security groups according to at least the set of destinations used in the packets sourced from the devices.

14. The method of claim 13, wherein querying comprises a Locator ID Separation Protocol (LISP) map server query.

15. The method of claim 1, wherein the cloud services comprise multi-cloud services.

16. The method of claim 1, further comprising:

triggering establishment of the dynamic provisioning configuration based on occurrence of a threshold-based event.

17. A tangible, non-transitory, computer-readable medium storing program instructions that cause a device to execute a process comprising:

identifying source security groups associated with devices of a computer network;

determining, based on observation of packets sourced from the devices, a set of destinations of the packets sourced from the devices;

deducing destination security groups associated with the devices based on the set of destinations used in the packets sourced from the devices;

identifying cloud services currently utilized by the devices based on the source security groups and the destination security groups; and establishing a dynamic provisioning configuration for the computer network based on the cloud services currently utilized by the devices in the computer network.

18. The tangible, non-transitory, computer-readable medium of claim 17, the process further comprising:

determining operational workflow state of network resource devices that provide the cloud services; and determining the dynamic provisioning configuration for the computer network based on the operational workflow state of the network resource devices.

19. The tangible, non-transitory, computer-readable medium of claim 17, the process further comprising:

establishing a digital twin of the computer network;

testing the dynamic provisioning configuration on the digital twin; and releasing the dynamic provisioning configuration to the computer network based on an outcome of testing.

20. An apparatus, comprising:

one or more network interfaces to communicate with a network;

a processor coupled to the one or more network interfaces and configured to execute one or more processes; and a memory configured to store a process that is executable by the processor, the process comprising:

identifying source security groups associated with devices of a computer network;

determining, based on observation of packets sourced from the devices, a set of destinations of the packets sourced from the devices;

deducing destination security groups associated with the devices based on the set of destinations used in the packets sourced from the devices;

identifying cloud services currently utilized by the devices based on the source security groups and the destination security groups; and establishing a dynamic provisioning configuration for the computer network based on the cloud services currently utilized by the devices in the computer network.

* * * * *